United States Patent Office 3,412,070
Patented Nov. 19, 1968

3,412,070
FIBERS OF A TEREPHTHALATE/ETHYLENE GLYCOL POLYESTER CONTAINING LESS THAN 0.5 PERCENT BY WEIGHT OF PHOSPHORUS INCORPORATED THEREIN BY PHOSPHONIC ACID ESTER LINKAGES
Franz Jakob, Hofheim, Taunus, and Hans Hoyer, Frankfurt am Main, Germany, assignors to Farbwerke Hoechst Aktiengesellschaft vormals Meister Lucius & Bruning, Frankfurt am Main-Hochst, Germany, a company of Germany
No Drawing. Continuation-in-part of application Ser. No. 204,044, June 21, 1962. This application Oct. 11, 1966, Ser. No. 585,754
Claims priority, application Germany, June 24, 1961, F 34,265
8 Claims. (Cl. 260—75)

ABSTRACT OF THE DISCLOSURE

Readily dyeable fibers and filaments of a thermostable polyester containing 0.05 to 0.5 percent by weight of phosphorus incorporated thereinto by phosphonic acid linkages and prepared by condensing (A) isophthalic and/or terephthalic acids or their esters with (B) ethylene glycol and (C) a phosponic acid ester

or a polymeric product obtained by heating a phosphonic acid di($\beta$-chloroethyl) ester.

The present application is a continuation-in-part of our application Ser. No. 204,044, filed June 21, 1962, now abandoned.

The present invention relates to fibers, filaments and the like formed of polyesters. More generally it relates to fibers, filaments and the like formed of modified, thermostable, phosphorus-containing polyesters which can readily be dyed. The term "fibers, filaments and the like" used throughout the specification shall mean all kinds of textile materials such as staple fibers, filaments, threads, yarns, tows, ropes, cords, cables and so on.

The high-melting polyesters, among them polyethylene terephthalate, do not possess, in the polymer molecule, special groups by which a fixation of dyestuffs is brought about. It is therefore difficult to dye the fibers and filaments prepared from these polyesters. The fibers and filaments prepared from polyesters are on the one hand difficult to dye as has just been mentioned and tend to pill whereas on the other hand they have excellent properties. In British patent specification No. 856,917 phosphorus-containing polyesters have been described in which phosphonic acid groups are present in dicarboxylic acids or glycols. These substituents improve the dyeability of the polyesters. However, dicarboxylic acids or glycols which are substituted by the phosphonic acid group and which have to be incorporated with the polyesters by condensation are difficultly accessible. In this case the phosphonic acid groups do not take part in the polycondensation. From the works of V. V. Korshak (Journal of Polymer Science, XXXI, 319 (1958)) pure phosphonic acid polyglycol esters and phosphonic acid polydiphenol esters are known. However, these esters are highly viscous oils or low-melting substances which cannot be used for the manufacture of fibers and filaments. There are also known organophosphorus polyesters which are derived from phosphinic oxide and in which the phosphorus is directly bound.

In Canadian patent specification No. 601,310 polyphosphonic acid esters modified by polycarboxylic acids, for example terephthalic acid, are described. In these polyphosphonates the phosphonate radicals are replaced by carboxylic acid radicals and in some cases products can be prepared containing as little as about 5% of phosphonic acid, calculated on the sum of carboxylic acids. These mixed polyesters of phosphonic acids and carboxylic acids are resinous products which, even when containing only 1% by weight of phosphorus, possess self-extinguishing properties. They are suitable as flame-proof additives, for the impregnation of paper and textile materials, as adhesives, lacquers and paints.

Now we have found new, useful fibers, filaments and the like formed of a polymeric polyester of (A) either terephthalic acid or mixtures of terephthalic acid with up to 15 percent by weight of isophthalic acid, (B) ethylene glycol and (C) a polyphosphonic acid ester of the formula

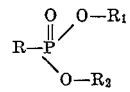

and polyglycol phosphonic acid polycondensation products thereof, wherein R is a member selected from the group consisting of alkyl, alkenyl, aryl, aralkyl, and alkylaryl, and chloro and bromo substituents thereof, and $R_1$ and $R_2$ are each selected from the group consisting of methyl, ethyl, propyl, isopropyl, phenyl, $\beta$-chloro-ethyl, $\beta$-bromoethyl, 2,3-dichloro propyl, 1,3-dichloro isopropyl, 2,3-dibromo propyl, 1,3-dibromo isopropyl and benzyl, said polymeric polyester containing between 0.05 and 0.5 percent by weight of phosphorus incorporated therein by phosphonic acid ester linkages.

The starting materials for the preparation of the modified polyesters for making the fibers of the invention are ethylene glycol and dicarboxylic acids.

The acids are preferably used in the form of an ester of a volatile and at most dihydric alcohol. Methyl esters and $\beta$-chloroethyl esters are particularly suitable. As the acid component, terephthalic acid is used along or in mixtures containing up to 15 percent by weight of isophthalic acid.

The phosphorus compounds to be added in the preparation of the polyester are bifunctional phosphonic acid esters of the general formula

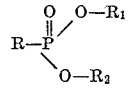

or the polycondensation products thereof. In the above formula R represents a saturated or olefinically unsaturated aliphatic or cycloaliphatic radical or an aromatic radical or the substitution products, especially the chloro alkyl, alkylcycloalkyl, alkenyl, aryl, alkylaryl, aralkyl radical or the substitution products, especially the chloro or bromo substitution products thereof as well as for the corresponding oxygen containing radicals, for example benzoyl methyl, benzoyl oxymethyl, m-methoxy phenyl.

$R_1$ and $R_2$ may be identical or different from one another. They may stand, for example, for the methyl, ethyl, propyl, isopropyl, phenyl, $\beta$-chloroethyl, $\beta$-bromethyl, 2,3-dichloro propyl, 2,3-dibromo propyl, 1,3-dichloro isopropyl, 1,3-dibromo isopropyl, or benzyl group or, in the case of polyphosphonic esters, for the methylene group.

As examples of such phosphonic acid esters there may be mentioned: the dimethyl esters and diethyl esters of methyl phosphonic acid, cyclohexylmethyl phosphonic acid, benzyl phosphonic acid, alpha-naphthyl-methylphosphonic acid, p-phenyl benzyl phosphonic acid, phenyl phosphonic acid, p-methyl phenyl phosphonic acid, 2,-dichloromethyl phosphonic acid, p-chloromethyl benzyl phosphonic acid, p-chlorobenzyl phosphonic acid and benzoyl methyl phosphonic acid, benzyl oxymethyl phosphonic acid diethyl ester, m-methoxy phenyl phosphonic acid dimethyl ester, vinyl phosphonic acid di-β-chlorethyl ester, alpha-chloromethyl phosphonic acid di-β-chlorethyl ester, β-chlorethyl phosphonic acid di-β-chlorethyl ester, β-bromethyl phosphonic acid di-β-bromethyl ester and the corresponding polyglycol phosphonic acid esters.

These materials are prepared by a known process taught by Korshak et al., Izvest. Akad. Nauk S.S.S.R., Otdel. Khim. Nauk, 210–216 (1958), abstracted in Chem. Abstr., 12804e (1958). The process comprises heating phosphonic acid di(β-chloroethyl)esters of the formula

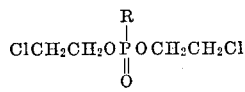

to 220°–250° C. with elimination of $(CH_2Cl)_2$.

On condensation with glycols and dicarboxylic acids, the polyglycol phosphonic acid esters are cleaved and the fragments of lower molecular weight that are split off are introduced by condensation into the polymer in the same manner as phosphonic acid esters, so that a modified polymer forms.

β-halogen ethyl phosphonic acid esters and p-chloromethyl benzyl phosphonic acid esters are particularly preferred. If it is desired to obtain a polycondensation product having a small number of chain members it may in certain cases be advantageous to add very small quantities of secondary phosphonic acid esters, for example, dibenzylphosphonic acid methyl ester.

Phosphonic acid esters of the aforesaid kind may be admixed with the reaction mixture from the beginning. It is, however, more suitable to add them after the dicarboxylic acid esters have undergone ester-interchange with glycol, for the organo-phosphorus compounds often cause an inhibition of the catalyst in the presence of which the interchange of ester radicals takes place whereby the interchange of the ester radicals is rendered difficult. In this case the polycondensation proceeds in known manner with the splitting off of glycol. It is, however, also possible to prepare precondensation products from the components which are free from phosphorus and to react them subsequently with the phosphonic acid esters or polyglycol phosphonic acid esters. By this measure the times of polymerization can be considerably shortened. The bifunctional phosphonic acid esters may be statistically distributed all over the macromolecule as members of the chain or they may be terminal members of the chain. When a halogen alkyl phosphonic acid ester is used a large portion of the halogen is split off.

In the polyesters which form the fibers, filaments and the like, according to the invention the content of phosphorus should be within the range of 0.05 to 0.5%. A higher content of phosphorus would lead to an embrittlement of the material which is not desirable. With regard to the improvement of the dyeability of the fibers, filaments and the like, the content of phosphorus should not be smaller than 0.05%, in the case of the modified polyethylene terephthalate. In this modified polyester a phosphorus content within the range of 0.1 to 0.3% is particularly advantageous with respect to the dyeability and with a view to obtaining a non-pilling fiber in which the other good properties of the non-modified polyester remain unchanged.

For the preparation of the polyesters which form the fibers, filaments and the like, according to the invention the ordinary transesterification and polycondensation catalysts are used, for example, salts of calcium, magnesium and zinc, alcoholates of alkali and alkaline earth metals, titanates and antimony trioxide. If desired, pigments or dulling agents, for example, barium carbonate and titanium dioxide, may be added in known manner in addition to oxidation inhibitors, for example, phosphorous acid or the alkyl or aryl esters thereof. The good properties of the fibers, filaments and the like according to the invention are not changed by the aforesaid additives.

Fibers, filaments and the like, according to the invention, which have been prepared from the phosphorus-containing polyesters, have no tendency towards pilling and have an improved affinity for dyestuffs, for example, for basic dyestuffs such as diphenyl methane dyestuffs, triphenyl methane dyestuffs, polymethine dyestuffs, indulines, safranines, thiozone dyestuffs, oxazine dyestuffs, phthaleins and xanthone dyestuffs, and also for dispersion dyestuffs such as 2-hydroxy-5-methyl-4′-acetamino-azobenzene, 1-amino-2-methoxy-4-amino-anthraquinone, 1.4-diamino-2-methoxy-anthraquinone and bromo-1.5-dioxy-4.8-diamino-anthraquinone. The ability of polyethlene terephthalates modified with β-chlorethyl phosphonic acid ester and p-chloromethyl benzyl phosphonic acid ester to be dyed with dispersion dystuffs is improved to such an extent that the fibers, filaments and the like can excellently be dyed even in the absence of a carrier at the boiling temperature of the aqueous dye bath.

It is surprising that the fibers, filaments and the like according to the invention formed of a modified polyester containing up to 0.5% by weight of phosphorus possess these advantageous properties since the modified polyesters described in Canadian patent specification No. 601,-310 having a phosphorus content of at least 1.0% by weight do not form fibers at all.

Because of their dyeability with basic dyestuffs as well as with dispersion dyestuffs, the fibers, filaments and the like according to the invention offer considerable advantages with respect to dyeing. They can, for example, be dyed simultaneously with basic dyestuffs and with dispersion dyestuffs. In this way a depth of color is obtained which is twice as great as that obtained in the same time by a dyeing in which dyestuffs of only one of the two aforesaid classes are used. Dyestuffs of the same or similar tints may also be used in order to enable saturated brilliant dyeings to be obtained or, in order to obtain mixed tints, dyestuffs of different tints of the aforesaid two classes may be used.

If in addition to fibers, filaments and the like formed of the modified polyesters, fibers made from non-modified polyethylene terephthalate are used, for example, in fabrics, there are very interesting possibilities of dyeing. If such fabrics are dyed with basic dyestuffs only, the non-modified polyethylene terephthalate fibers remain unchanged whereas when such fabrics are dyed with mixtures of basic dyestuffs and dispersion dyestuffs interesting two color effects can be obtained.

If fabrics of the aforesaid kind are printed new color effects can be obtained by combining the use of a locally fixed dyestuff with a subsequent overdyeing. Another important advantage of the fibers, filaments and the like formed of modified polyesters according to the invention is that in order to reduce the electrostatic charge, hydrophilic substances of basic character, for example, amino alcohols, amino sugars and amino phenols, can be fixed to the surface of the modified polyester fiber. Since these substances are bound in a very stable way to the modified fiber reactive dyestuffs, for example, dyestuffs of the vinyl sulfonic series and of the cyanuric-chloride series may be used for the subsequent dyeing of the fibers which have thus been prepared.

The following examples serve to illustrate the invention but they are not intended to limit it thereto.

Example 1

500 grams of terephthalic acid dimethyl ester were subjected for 3 to 4 hours to an interchange of ester radicals with 406 grams of ethylene glycol in the presence of 0.115 gram of zinc acetate and 0.153 gram of antimony trioxide. Within that period the temperature rose to 215° C. while an active splitting off of methanol took place.

Subsequently 12 grams of β-chlorethyl phosphonic acid di-β-chlorethyl ester were added. The mixture was maintained for 1 hour at a temperature within the range of 200° C. to 220° C. under nitrogen. It was then heated to 250° C. and subsequently to 275° C. while the pressure was gradually reduced (final pressure at most 1 mm. of mercury). After 4 to 5 hours of colorless polycondensation product containing 0.2% of phosphorus and 0.05% of chlorine and having a relative viscosity of 1.82 (determined in a solution of 1% strength at 25° C., the solvent consisting of 3 parts of phenol and 2 parts of tetrachlororethane) was obtained.

When 2.0 grams of titanium dioxide suspended in ethylene glycol were added to the reaction mixture a dull polyester was obtained.

The polyester could be spun at a temperature of 270° C. In contradistinction to polyethylene terephthalate which had not been modified, the filaments prepared from the polyester obtained according to this example, which had been drawn and fixed and possessed good textile properties, could be dyed deep brilliant tints within 1 hour at 100° C. with basic dyestuffs, for example, malachite green, or with dispersion dyestuffs, for example, 2-hydroxy-5-methyl-4'-acetamino-azobenzene, 1-amino-2-methoxy-4-amino-anthraquinone, 1.4-diamino-2-methoxy-anthraquinone and bromo-1.5-dihydroxy-4.8-diamino-anthraquinone, in an aqueous liquid containing 2 to 4%, calculated on the weight of the fiber, of dyestuff. The dyeings had an excellent fastness to light, washing and abrasion. Staple fibers and staple fiber yarns prepared from the filaments of the polyesters according to this example had no tendency towards pilling.

Example 2

500 grams of a precondensation product of terephthalic acid dimethyl ester and ethylene glycol which was not yet spinable were kept for 1 hour under nitrogen and under normal pressure at 250° C. together with 13 grams of β-chlorethly phosphonic acid di-β-chlorethyl ester and subsequently condensation was completed within 1 hour at a final temperature of 278° C. and under a pressure of 1 mm. of mercury. The colorless polymer thus obtained had a relative viscosity of 1.86 (determined as described in Example 1) and contained 0.24% of phosphorus. It could be well spun into filaments. The textile properties of the spun filament were to a large extent analogous to those mentioned in Example 1.

Example 3

444 grams of terephthalic acid dimethyl ester and 360 grams of ethylene glycol were subjected to an interchange of ester radicals in the presence of 0.135 gram of antimony trioxide and 0.102 gram of zinc acetate at a rising temperature (160° C. to 225° C.). After the splitting off of methanol was terminated, 9 grams of 4-chloromethyl-benzyl-phosphonic acid diethyl ester were added. The said 4-chloromethyl-benzyl-phosphonic acid diethyl ester had been prepared from p-chloro-methyl-benzyl-chloride and triethyl phosphite which were used in a molar ratio of 1:1, at a temperature within the range of 150° C. to 160° C. while ethyl chloride was eliminated (boiling point: 157° C. to 159° C. under a pressure of 0.002 mm. of mercury). The temperature was kept for 1 hour within the range of 200° C. to 220° C. and then increased to 250° C. Condensation was terminated within 4 hours while the pressure was reduced (final pressure 1 mm. of mercury) and the temperature was gradually raised to 275° C. The polycondensation product, which had a pale color had a relative viscosity of 1.8 and contained 0.2% of phosphorus and less than 0.2% of chlorine. The product could well be spun to filaments at 280° C. The drawn filaments thus prepared did not pill and could be dyed deep tints under the conditions indicated in Example 1 with the dyestuffs mentioned in that example. Staple fibers prepared from these filaments had no tendency towards pilling when processed into the yarns or when processed into tissues.

Example 4

500 grams of terephthalic acid dimethyl ester were subjected to an interchange of ester radicals with 406 grams of ethylene glycol in the presence of 0.115 gram of zinc acetate and 0.152 gram of antimony trioxide in the manner described in Example 1. Subsequently 15 grams of vinyl phosphonic acid di-β-chlorethyl ester were added and the clear solution was kept for 90 minutes under nitrogen at a temperature of 210° C. and for 30 minutes at a temperature within the range of 230° C. to 235° C. Condensation of the batch, which was heated to 250° C. was terminated by gradually reducing the pressure until it amounted to less than 1 mm. of mercury and by heating to 276° C. A portion of the vinyl phosphonic acid ester distilled off during this operation. The yellow melt solidified and formed a polyester which was faintly colored, which contained 0.12% of phosphorus and had a relative viscosity of 1.75 (determined as described in Example 1).

The product could be spun at 270° C., to form filaments which could be drawn and very well be dyed with basic dyestuffs and dispersion dyestuffs as described in Example 1.

Example 5

500 grams of terephthalic acid dimethyl ester were subjected to an interchange of ester radicals with 406 grams of ethylene glycol in the presence of 0.153 gram of antimony trioxide and 0.115 gram of zinc acetate in the manner described in Example 1. After the addition of 9.5 grams of alpha-naphthyl methyl phosphonic acid diethyl ester the reaction mixture was kept for 1 hour at 220° C. under nitrogen. It was then heated to 250° C. Condensation was continued at the same temperature while the pressure was reduced until a final pressure of 1 mm. of mercury was attained and finally the whole was heated to 275° C. After 4½ hours the reaction was interrupted. The polyester had a slightly gray color and had a relative viscosity of 1.75 (determined as described in Example 1). It contained 0.18% of phosphorus. The product could be spun at 270° C. to form filaments. Fibers prepared from it did not pill and had a considerably improved ability of being dyed with basic dyestuffs and dispersion dyestuffs as have been mentioned in Example 1.

Example 6

254 grams of terephthalic acid diglycol ester were heated for 2 hours at 218° C. in 32 grams of ethylene glycol with 0.05 gram of antimony trioxide and 5 grams of polyglycol phenyl phosphonic acid ester which had been prepared by heating phenyl phosphonic acid di-β-chlorethyl ester for 10 hours at 250° C. (cf. Chem. Abst. 1958, 12804e). After the mixture had been heated to 250° C. the pressure was reduced within 2 hours until finally it amounted to 0.5 mm. of mercury and the mixture was condensed for 1½ hours at 275° C. until the desired degree of viscosity was attained. The colorless polymer thus obtained had a relative viscosity of 1.86 and contained 0.22% of phosphorus. The phosphorus-containing polycondensation product could be spun at 275° C. and be drawn in the normal manner. The fibers thereof did not pill and, in contradistinction to filaments prepared from non-modified polyethylene terephthalate, they could excellently be dyed under the conditions indicated in Example 1 with the dyestuffs mentioned in that example.

Example 7

444 grams of terephthalic acid dimethyl ester and 360 grams of ethylene glycol were subjected to an interchange of ester radicals in the presence of 0.135 gram of antimony trioxide and 0.102 gram of zinc acetate in the manner described in Example 1. After the addition of 5.5 grams of a phosphonic acid ester, the mixture was kept under nitrogen for 2 hours at 220° C. (The phosphonic acid ester added, the true formula of which could not be determined, was prepared by introducing 3 mols of epichlorhydrine drop by drop at a temperature below 30° C. into 1 mol of phosphorous trichloride and by subsequently rearranging the tertiary phosphate that formed into a phosphonic acid ester by heating for 5 hours at 155° C. The ester (boiling point: 198° C.–208° C. at 0.02–0.06 mm.) had one of the possible formulas:

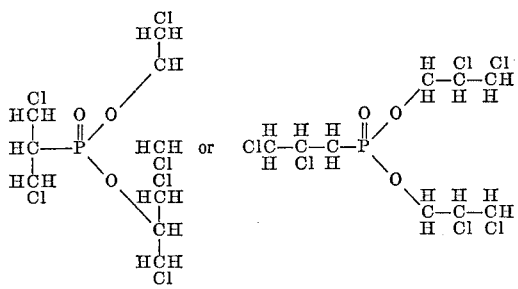

Within 2 hours at 250° C. a final pressure of 1 mm. of mercury was attained and the mixture was condensed at 275° C. for 3 hours until the relative viscosity was 1.75. In the reaction 1.3-dichloro-propanol-2 was split off. The colorless product could well be spun to filaments at 285° C. The drawn filament, too, possessed good textile properties and could be dyed in the manner described in Example 1 with the dyestuffs mentioned in that example.

When 1 mol of hydrogen chloride was split off by means of methanolic potassium hydroxide solution from the alkyl group of the phosphonic acid ester used, which was bound to the phosphorous atom, the properties of the phosphonic acid ester which then contained chloromethyl and vinyl groups did not change after the ester had been condensed into polyethylene terephthalate.

Example 8

450 grams of terephthalic acid dimethyl ester, 50 grams of isophthalic acid dimethyl ester and 409 grams of ethylene glycol were subjected to an interchange of ester radicals within two hours at a temperature within the range of 160° C. to 210° C. in the presence of 0.115 gram of zinc acetate. After the addition of 0.153 gram of antimony trioxide and 12 grams of β-chlorethyl-phosphonic acid di-β-chlorethyl ester, the clear solution was kept for 1 hour at 210° C. and subsequently polycondensed within 4½ hours while the pressure was reduced (final pressure 0.8 mm. of mercury) and the temperature was increased (final temperature 275° C.). The polyester had a phosphorus content of 0.19%, a relative viscosity of 1.99 (determined as in Example 1) and a softening point of 215° C.

The product could be spun at 240° C. The drawn filaments could be dyed deep brilliant tints with basic dyestuffs and with dispersion dyestuffs.

What is claimed is:
1. A fibrous product consisting essentially of a formed polyester condensation polymer of (A) a member selected from the group consisting of terephthalic acid, esters of terephthalic acid with volatile monohydric or dihydric alcohols, and mixtures of terephthalic acid or its said esters with up to 15 percent by weight of isophthalic acid or esters of isophthalic acid with volatile monohydric or dihydric alcohols, (B) ethylene glycol, and (C) a member from the group consisting of a phosphonic acid ester of the formula

and a polymeric product obtained by heating a phosphonic acid di(β-chloroethyl) ester of the formula

to 220°–250° C. with elimination of $(CH_2Cl)_2$, wherein R is a member selected from the group consisting of saturated aliphatic radicals, olefinically unsaturated aliphatic radicals, cycloaliphatic radicals, and aromatic radicals, and $R_1$ and $R_2$ are each selected from the group consisting of methyl, ethyl, propyl, isopropyl, phenyl, β-chloroethyl, β-bromoethyl, 2,3 - dichloropropyl, 2,3 - dibromopropyl, 1,3 - dichloroisopropyl, 1,3 - dibromoisopropyl, and benzyl, said polymer of (A), (B), and (C) containing between 0.05 and 0.5 percent by weight of phosphorus incorporated thereinto by phosphonic acid ester linkages.

2. A fibrous product according to claim 1 wherein said phosphonic acid ester has the formula $$R-\overset{O}{\underset{}{P}}\diagdown_{O-R_2}^{O-R_1}$$

wherein R is a member selected from the group consisting of alkyl, alkenyl, aryl, aralkyl and alkylaryl, and chloro and bromo substituents thereof.

3. A fibrous product according to claim 1 wherein said dicarboxylic acid is terephthalic acid and wherein said ternary polyester contains between 0.1 to 0.3 percent by weight of phosphorus.

4. A fibrous product according to claim 1 wherein (C) is β-chloroethyl phosphonic acid di-β-chloroethyl ester.

5. A fibrous product according to claim 1 wherein (C) is 4-chloro-methyl-benzyl-phosphonic diethyl ester.

6. A fibrous product according to claim 1 wherein (C) is vinyl phosphonic acid di-β-chloroethyl ester.

7. A fibrous product according to claim 1 wherein (C) is α-naphthyl methyl phosphonic acid diethylester.

8. A fibrous product according to claim 1 wherein (C) is a polymeric product obtained by heating phenyl phosphonic acid di(β-chloroethyl) ester.

References Cited

UNITED STATES PATENTS

| | | | |
|---|---|---|---|
| 2,877,204 | 3/1959 | Duhnkrack et al. | 260—75 |
| 3,052,653 | 9/1962 | Iannicelli | 260—75 |
| 3,058,935 | 10/1962 | Starck et al. | 260—75 |

FOREIGN PATENTS

| | | |
|---|---|---|
| 883,754 | 12/1961 | Great Britain. |
| 601,309 | 7/1960 | Canada. |
| 601,310 | 7/1960 | Canada. |
| 568,816 | 12/1958 | Belgium. |

OTHER REFERENCES

Pages 319–326, Journal of Polymer Science, vol. XXXI (1958); Prague Symposium Article by Korshak, QD281, p. 6–76.

WILLIAM H. SHORT, *Primary Examiner.*

LOUISE P. QUAST, *Assistant Examiner.*